(12) United States Patent
Bringhurst

(10) Patent No.: US 8,881,140 B1
(45) Date of Patent: Nov. 4, 2014

(54) SYSTEMS AND METHODS FOR VIRTUALIZING SOFTWARE ASSOCIATED WITH EXTERNAL COMPUTER HARDWARE DEVICES

(75) Inventor: Cynthia Bringhurst, Springville, UT (US)

(73) Assignee: Symantec Corporation, Mountain View, CA (US)

( * ) Notice: Subject to any disclaimer, the term of this patent is extended or adjusted under 35 U.S.C. 154(b) by 1178 days.

(21) Appl. No.: 12/554,413

(22) Filed: Sep. 4, 2009

(51) Int. Cl.
*G06F 9/455* (2006.01)
*G06F 3/038* (2013.01)
*G06F 15/177* (2006.01)
*H04L 29/08* (2006.01)
*G06F 9/44* (2006.01)

(52) U.S. Cl.
CPC .............. *G06F 9/4411* (2013.01); *H04L 67/34* (2013.01); *G06F 9/455* (2013.01)
USPC ................ 718/1; 719/327; 719/324; 709/221

(58) Field of Classification Search
None
See application file for complete search history.

(56) References Cited

U.S. PATENT DOCUMENTS

| | | | | |
|---|---|---|---|---|
| 4,649,479 A * | 3/1987 | Advani et al. ...................... 718/1 |
| 5,313,646 A | 5/1994 | Hendricks |
| 5,537,539 A | 7/1996 | Narihiro |
| 5,561,799 A | 10/1996 | Khalidi |
| 5,586,304 A | 12/1996 | Stupek, Jr. et al. |
| 5,796,393 A | 8/1998 | MacNaughton et al. |
| 5,905,990 A | 5/1999 | Inglett |
| 5,930,513 A | 7/1999 | Taylor |
| 5,933,647 A | 8/1999 | Aronberg et al. |
| 5,949,979 A * | 9/1999 | Snow et al. .................... 710/302 |
| 5,991,402 A | 11/1999 | Jia |
| 5,991,753 A | 11/1999 | Wilde |
| 6,128,647 A | 10/2000 | Haury |
| 6,161,218 A | 12/2000 | Taylor |
| 6,185,574 B1 | 2/2001 | Howard et al. |
| 6,195,650 B1 | 2/2001 | Gaither et al. |
| 6,356,915 B1 | 3/2002 | Chtchetkine |
| 6,366,900 B1 | 4/2002 | Hu |
| 6,374,402 B1 | 4/2002 | Schmeidler et al. |
| 6,381,735 B1 | 4/2002 | Hunt |
| 6,453,468 B1 | 9/2002 | D'Souza |
| 6,934,740 B1 | 8/2005 | Lawande et al. |
| 7,076,539 B2 * | 7/2006 | Reese et al. ................... 709/222 |
| 7,117,495 B2 | 10/2006 | Blaser et al. |

(Continued)

OTHER PUBLICATIONS

Blanchard, Hollis; "Virtualization and Hypervisors"; Last updated Jun. 19, 2009; planet-ltc.org; http://www.planet-ltc.org/aggregator/sources/20.

(Continued)

*Primary Examiner* — Qing Wu
*Assistant Examiner* — Kevin X Lu
(74) *Attorney, Agent, or Firm* — ALG Intellectual Property, LLC

(57) ABSTRACT

A method for virtualizing software associated with external computer hardware devices. The method may include maintaining a virtualized device profile associated with an external hardware device and receiving a request to provide the virtualized device profile to a client system to which the external hardware device can be temporarily connected. The method may also include downloading the virtualized device profile to the client system and installing the virtualized device profile as one or more virtualization layers on the client system. The method may further include activating the one or more virtualization layers to enable the virtualized device profile to be used to interact with the external hardware device.

20 Claims, 9 Drawing Sheets

(56) References Cited

U.S. PATENT DOCUMENTS

| | | | |
|---|---|---|---|
| 7,162,724 | B2 | 1/2007 | Blaser et al. |
| 7,165,260 | B2 | 1/2007 | Blaser et al. |
| 7,188,120 | B1 | 3/2007 | Leonard et al. |
| 7,433,935 | B1 | 10/2008 | Obert |
| 7,461,086 | B1 | 12/2008 | Hurren et al. |
| 7,461,096 | B1 | 12/2008 | Hurren et al. |
| 7,496,931 | B2 | 2/2009 | Cook et al. |
| 7,512,977 | B2 | 3/2009 | Cook et al. |
| 7,519,963 | B1 | 4/2009 | Blaser et al. |
| 7,542,988 | B1 | 6/2009 | Cook et al. |
| 7,549,164 | B2 | 6/2009 | Cook et al. |
| 7,555,483 | B2 | 6/2009 | Maeda et al. |
| 7,620,956 | B2 | 11/2009 | Cook et al. |
| 7,680,758 | B2 | 3/2010 | Laborczfalvi et al. |
| 7,877,413 | B1 | 1/2011 | Cook et al. |
| 7,886,291 | B1 | 2/2011 | Jones et al. |
| 7,912,822 | B2 * | 3/2011 | Bethlehem et al. ........... 707/705 |
| 7,945,897 | B1 | 5/2011 | Cook |
| 7,970,789 | B1 | 6/2011 | Blaser et al. |
| 8,010,961 | B1 | 8/2011 | Cook et al. |
| 8,060,940 | B2 | 11/2011 | McCorkendale et al. |
| 8,108,346 | B1 | 1/2012 | Hurren et al. |
| 8,112,392 | B1 | 2/2012 | Bunnell et al. |
| 8,112,767 | B1 | 2/2012 | Cook |
| 8,225,316 | B1 | 7/2012 | Bunnell et al. |
| 8,261,254 | B2 | 9/2012 | Cook |
| 8,291,407 | B2 | 10/2012 | Greenwood et al. |
| 8,302,108 | B1 | 10/2012 | Hurren et al. |
| 8,341,648 | B1 | 12/2012 | Cook |
| 8,407,700 | B2 | 3/2013 | Bunnell et al. |
| 2002/0100036 | A1 | 7/2002 | Moshir |
| 2002/0157089 | A1 | 10/2002 | Patel et al. |
| 2002/0174215 | A1 | 11/2002 | Schaefer |
| 2003/0033441 | A1 | 2/2003 | Forin et al. |
| 2003/0233647 | A1 | 12/2003 | Blaser et al. |
| 2004/0015949 | A1 | 1/2004 | Taylor |
| 2004/0181593 | A1 * | 9/2004 | Kanojia et al. ................ 709/220 |
| 2004/0260761 | A1 | 12/2004 | Leaute et al. |
| 2005/0091652 | A1 | 4/2005 | Ross et al. |
| 2005/0091658 | A1 | 4/2005 | Kavalam et al. |
| 2006/0010203 | A1 | 1/2006 | Mrsic-Flogel et al. |
| 2006/0143247 | A1 | 6/2006 | Poole et al. |
| 2006/0221370 | A1 * | 10/2006 | Iida ............................. 358/1.13 |
| 2006/0236323 | A1 | 10/2006 | Neill et al. |
| 2006/0259949 | A1 | 11/2006 | Schaefer et al. |
| 2007/0061477 | A1 * | 3/2007 | Stoyanov et al. ............. 709/230 |
| 2007/0067769 | A1 * | 3/2007 | Geisinger ......................... 718/1 |
| 2007/0180450 | A1 | 8/2007 | Croft et al. |
| 2007/0250695 | A1 * | 10/2007 | Philyaw ............................ 713/1 |
| 2007/0288623 | A1 * | 12/2007 | Kato et al. .................... 709/223 |
| 2008/0091792 | A1 | 4/2008 | Mei et al. |
| 2008/0288484 | A1 * | 11/2008 | Bouzid et al. ..................... 707/5 |
| 2009/0249051 | A1 | 10/2009 | TeNgaio et al. |
| 2009/0249366 | A1 * | 10/2009 | Sen et al. ...................... 719/327 |
| 2010/0023934 | A1 | 1/2010 | Sheehan et al. |
| 2010/0107155 | A1 * | 4/2010 | Banerjee et al. ............. 717/177 |
| 2011/0010756 | A1 | 1/2011 | Choi et al. |
| 2011/0061045 | A1 | 3/2011 | Phillips |

OTHER PUBLICATIONS govirtual.org; Hardware or System Virtualization; govirtual.org/community/hardwarevirtualization, as accessed on Jul. 8, 2009.
Geek Squad; Geek Squad Check Repair Status; www.geeksquad.com/services/content.aspx?id=1827, as accessed on Jul. 8, 2009.
salesforce.com, Inc.; Because IT Should Be Strategic, Not Tactical; salesforce.com; www.salesforce.com/platform/why-ondemand/, as accessed on Jul. 8, 2009.
Drew Robb; Hardware Today: Meeting the Demand for on Demand; Serverwatch.com; www.serverwatch.com/hreviews/article.php/3524346, as accessed on Jul. 8, 2009.
Altiris®; Altiris® Software Virtualization Solution 2.1, Reference Guide; eval.symantec.com/mktginfo/enterprise/other_resources/b-altiris_software_virtualization_solution_guide.en-us.pdf, as accessed on Jul. 8, 2009.
Altiris®; Altiris® Streaming System 5.2.2 Administrator's Guide; www.symantec.com/business/products/support.jsp?pcid=pcat_business_cont&pvid=sv_sol_pro_1, as accessed on Jul. 8, 2009.
Liberating personal computing from hardware; The Internet Suspend/Resume (ISR) project; isr.cmu.edu/, as accessed on Jul. 8, 2009.
Michael Kozuch, et al.; Internet Suspend/Resume; Accepted to the Fourth IEEE Workshop on Mobile Computing Systems and Applications; Jun. 2002; Callicoon, NY; www.intel-research.net/Publications/Pittsburgh/110620030912_88.pdf, as accessed on Jul. 8, 2009.
Michael Kozuch, et al.; Efficient State Transfer for Internet Suspend/Resume; Intel Research Pittsburgh; 2002; www.intel-research.net/Publications/Pittsburgh/081620021311_93.pdf, as accessed on Jul. 8, 2009.
David Greschler; Turning Software into a Service: There are no Silver Bullets!; Apr. 24, 2003 or earlier; www.softricity.com.
Softricity, Inc.; SoftGrid for Windows Desktops Transforms Business Applications into Web-enabled Services, Reshaping the Economics of Enterprise Computing; Oct. 15, 2001; www.softricity.com.
Fortres Grand Corportation; Clean Slate; 2003; www.fortres.com/products/cleanslate.htm.
Softricity, Inc.; Softricity Acquires Intellectual Property of Seaport Software to Extend Virtual Installation Technology; Nov. 18, 2002; Business Wire, Boston; www.thefreelibrary.com/Softricity+Acquires+Intellectual+Property+of+Seaport+Software+to...-a094387795.
Fortres Grand Corportation; Computer Security Software—A Lifesaver for Schools; May/Jun. 2001; p. 42; Media & Methods; www.fortres.com.
Fortres Grand Corportation; Clean Slate Frequently Asked Questions; 2003; www.fortres.com/products/cleanslate—faq.htm.
Microsoft Windows NT Resource Kit; 1993; pp. 325-346; vol. 1; Microsoft Press.
Fortres Grand Corportation; Fortres 101; 2003; www.fortres.com/products/awards.htm#cleanslate.
John S. Heidemann, et al; File-System Development with Stackable Layers; ACM Transactions on Computer Systems; Feb. 1994; pp. 58-89; vol. 12, No. 1; University of California, Los Angeles.
Jeff Tranter; CD-ROM and Linux; Linux Journal; Nov. 1, 1994; Issue #7; SSC Publications, Inc.; www.linuxjournal.com/article/2851.
Jeff Tranter; The Linux CD-ROM Howto; Aug. 21, 1994; v1.2; www.ibiblio.org/pub/historic-linux/ftp-archives/sunsite.unc.edu/Nov-06-1994/docs/HOWTO/CDROM-HOWTO.
Kernal-based Inheriting File System (IFS), experimental release 5; Contents of ifs.5.1.tar.gz; Filename: "Readme"; source code tarball; Oct. 7, 1996; www.ibiblio.org/pub/historic-linux/ftp-archives/tsx-11.mit.edu/Oct-07-1996/ALPHA/ifs/.
Kevin Newcomb; Softricity Has Cure for App Conflict Blues; Thin Planet; May 2002; Part 1 of 2; Jupitermedia Corp.
Kevin Newcomb; Softricity Has Cure for App Conflict Blues; Thin Planet; May 2002; Part 2 of 2; Jupitermedia Corp.
Softricity, Inc.; SystemGuard; Apr. 24, 2003 or earlier; www.softricity.com.
Softricity, Inc.; Softricity Secures $14.6 Million in Oversubscribed Third Round Venture Funding; Jul. 29, 2002; www.softricity.com.
Microsoft Corporation and Softricity, Inc.; Microsoft and Softricity Announce Agreement to Manage Existing Windows Applications with Web Services; May 28, 2002; www.softricity.com.
Softricity, Inc.; Softricity Announces SoftGrid 2.0 First Customer Deployments and General Availability; May 6, 2002; www.softricity.com.
Softricity, Inc.; Softricity Unveils SoftGrid Dual-Mode; Gartner Symposium ITxpo; Mar. 24, 2003; www.softricity.com.
Softricity, Inc.; SoftGrid Sequencer; Apr. 24, 2003 or earlier; www.softricity.com.
Softricity, Inc.; Softricity Becomes Premier Member of Citrix Business Alliance; Feb. 25, 2002; www.softricity.com.
John Longwell; Softricity Lowers Price on Dual-Mode Deployments; CRN; Mar. 28, 2003; CMP Media LLC; www.crn.com/news/channel-programs/18822151/softricity-lowers-price-on-dual-mode-deployments.htm.
Microsoft Corporation and Softricity, Inc.; Microsoft and Softricity Announce Agreement to Manage Existing Windows Applications with Web Services; May 28, 2002; Microsoft News Center News

(56) References Cited

OTHER PUBLICATIONS

Archive (formerly PressPass); Microsoft; www.microsoft.com/en-us/news/press/2002/May02/05-28softricitypr.aspx.
Softricity, Inc.; Softricity Data Sheet: Softricity SystemGuard, Softricity's patent-pending technology enables any application to run on any desktop or server at any time.; Oct. 2002; pp. 1-2; www.softricity.com.
Softricity, Inc.; Softricity Data Sheet: Softricity SystemGuard, The Foundation for Stable On-Demand Application Access; Feb. 2002; pp. 1-2; www.softricity.com.
Softricity, Inc.; Softricity SoftGrid Platform, Softricity Platform Training Guide; Apr. 24, 2003 or earlier; www.softricity.com.
Overlay Filesystem; Contents of ovlfs1.0.src.tgz; Filename "doc/Description"; source code tarball; Last Modified Mar. 11, 1998; www.ibiblio.org/pub/Linux/system/filesystems/.
Fortres Grand Corportation; FAQ Article ID: 2001013; Oct. 24, 2003; pp. 1-2; www.fortres.com/support/faqviewarticle.asp?ID=2001013.
Fortres Grand Corportation; FAQ Article ID: 2001014; Nov. 25, 2003; p. 1; www.fortres.com/support/faqviewarticle.asp?ID=2001014.
Fortres Grand Corportation; FAQ Article ID: 2001015; Nov. 23, 2003; p. 1; www.fortres.com/support/faqviewarticle.asp?ID=2001015.
Fortres Grand Corportation; FAQ Article ID: 2001025; Dec. 15, 2003; p. 1; www.fortres.com/support/faqviewarticle.asp?ID=2001025.
Search Report and Written Opinion received in related European Application No. EP 08164483.3; Feb. 9, 2009.
Josef Sipek, et al.; Kernel Support for Stackable File Systems; Proceedings of the 2007 Linux Symposium; Jul. 27-30, 2007; pp. 223-227; vol. Two; Canada.
David Quigley, et al; Unionfs: User- and Community-Oriented Development of a Unification File System; Proceedings of the 2006 Linux Symposium; Jul. 2006; pp. 1-14; Canada.
Erez Zadok, et al.; On Incremental File System Development; ACM Transactions on Storage; May 2006; pp. 1-33; vol. 2, No. 2; ACM, Inc.
Charles P. Wright, et al.; Kernel Korner, Unionfs: Bringing Filesystems Together; Linux Journal; Dec. 1, 2004; pp. 1-6; vol. 2004, No. 128; Westport, CT, USA.
Erez Zadok, et al.; FiST: A Language for Stackable File Systems; Proceedings of the 2000 USENIX Annual Technical Conference; Jun. 18-23, 2000; pp. 55-70; USENIX Association; San Diego, CA, USA.
Charles P. Wright, et al.; Versatility and Unix Semantics in Namespace Unification; ACM Transactions on Storage ACM; Nov. 2005; pp. 1-29; vol. 1, No. 4; ACM, Inc.
Mitchell Ashley; Layered Network Security: A best-practices approach; White Paper; Jan. 2003; Latis Networks, Inc.; Superior, CO, USA.
David Mosberger, et al.; Making Paths Explicit in the Scout Operating System; Proceedings of the USENIX 2nd Symposium on Operating Systems Design and Implementation; Oct. 1996; USENIX Association; Seattle, WA, USA.
Bradley Baird; Systems and Methods for Merging Virtual Layers; U.S. Appl. No. 12/843,098, filed Jul. 26, 2010.
Michael Spertus, et al.; Systems and Methods for Using Virtualization to Implement Information Rights Management; U.S. Appl. No. 12/715,213, filed Mar. 1, 2010.

* cited by examiner

SYSTEMS AND METHODS FOR VIRTUALIZING SOFTWARE ASSOCIATED WITH EXTERNAL COMPUTER HARDWARE DEVICES

BACKGROUND

Users may access multiple computing devices in a variety of environments. For example, a user may move from one workstation to another in an enterprise environment. Similarly, a user may work on a work desktop at work, a home desktop at home, and a laptop while traveling. When moving from one computer to another, a user may also move an external hardware device from one computer to another.

Each time a user moves an external hardware device from one computer to another, the user may need to go through the process of reinstalling and/or reconfiguring software for the external hardware device. For example, the user may need to reinstall drivers, reinstall applications, and/or reconfigure settings when moving an external hardware device from one computer to another computer. What is needed, therefore, is a more efficient and effective way to manage software associated with external hardware devices in multi-computer environments.

SUMMARY

As will be described in greater detail below, the instant disclosure generally relates to systems and methods for virtualizing software associated with external computer hardware devices. Embodiments of the instant disclosure may facilitate efficient and effective use of external hardware devices that may be moved between computers. Embodiments of the instant disclosure may also facilitate installing software on a computing device in other contexts. For example, a method may include maintaining a virtualized device profile associated with an external hardware device. The method may also include receiving a request to provide the virtualized device profile to a client system to which the external hardware device can be temporarily connected. The method may further include downloading the virtualized device profile to the client system, installing the virtualized device profile as one or more virtualization layers on the client system, and activating the one or more virtualization layers to enable the virtualized device profile to be used to interact with the external hardware device.

In some embodiments, the method may include identifying a user that is using the client system and selecting, based on the identification of the user, the virtualized device profile from a set of virtualized device profiles associated with the external hardware device. The virtualized device profile may include user-customized settings associated with the external hardware device and the user, and the request to provide the virtualized device profile to the client system may be received in response to the user logging onto the client system.

According to certain embodiments, the method may include determining that a virtualization agent is not installed on the client system and downloading the virtualization agent to the client system. The virtualization agent may be programmed to manage application virtualization layers, and activating the virtualization agent may be performed by the virtualization agent. The method may further include uninstalling the virtualization agent from the client system when the external hardware device is disconnected from the client system.

The method may include determining that a driver for the external hardware device is not installed on the client system. In such embodiments, downloading the virtualized device profile to the client system may include downloading the driver to the client system and installing the virtualized device profile to the client system in a virtualization layer may include installing the driver to the client system in the virtualization layer.

In certain embodiments, the method includes deactivating the virtualization layer when the hardware device is disconnected from the client system and/or a user logs off the client system. After the virtualization layer is deactivated, the virtualization layer may be deleted. According to some embodiments, the method may include detecting connection of the external hardware device to the client system. In such embodiments, the request to provide the virtualized device profile to the client system may be performed in response to detecting the connection of the external hardware device.

According to various embodiments, a system may include a storage device configured to store a virtualized device profile associated with an external hardware device. The system may also include a detection module programmed to receive a request to provide the virtualized device profile to a client system to which the external hardware device can be temporarily connected. The system may further include a download module programmed to download the virtualized device profile to the client system, an installation module programmed to install the virtualized device profile to the client system in a virtualization layer, and a virtualization module programmed to activate the virtualization layer to enable the virtualized device profile to be used to interact with the external hardware device. The system may include at least one processor programmed to execute the detection module, the download module, the installation module, and the virtualization module.

The detection module is further programmed to identify a user that is using the client system and select, based on the identification of the user, the virtualized device profile from a set of virtualized device profiles associated with the external hardware device. In some embodiments, the virtualized device profile may include user-customized settings associated with the external hardware device and the user. Additionally or alternatively, the request to provide the virtualized device profile to the client system may be received in response to the user logging onto the client system.

According to various embodiments, the detection module may be further programmed to determine that a driver for the external hardware device is not installed. In such embodiments, the virtualized device profile may include the driver for the external hardware device.

The virtualization module may be programmed to deactivate the virtualization layer when the hardware device is disconnected from the client system and/or a user logs off the client system. The virtualization module may also be programmed to delete the virtualization layer after the virtualization layer is deactivated. Additionally or alternatively, the detection module may be programmed to detect connection of the external hardware device to the client system. In such embodiments, the request to provide the virtualized device profile to the client system may be performed in response to detecting the connection of the external hardware device.

In certain embodiments, A computer-readable-storage medium may include one or more computer-executable instructions that, when executed by a computing device, cause the computing device to (1) maintain a virtualized device profile associated with an external hardware device, (2) receive a request to provide the virtualized device profile to a client system to which the external hardware device can be temporarily connected, (3) download the virtualized device profile to the client system, (4) install the virtualized device profile to the client system in a virtualization layer, and (5) activate the virtualization layer to enable the virtualized device profile to be used to interact with the external hardware device. The one or more computer-executable instructions may be further programmed to cause the computing device to identify a user that is using the client system and select, based on the identification of the user, the virtualized device profile from a set of virtualized device profiles associated with the external hardware device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
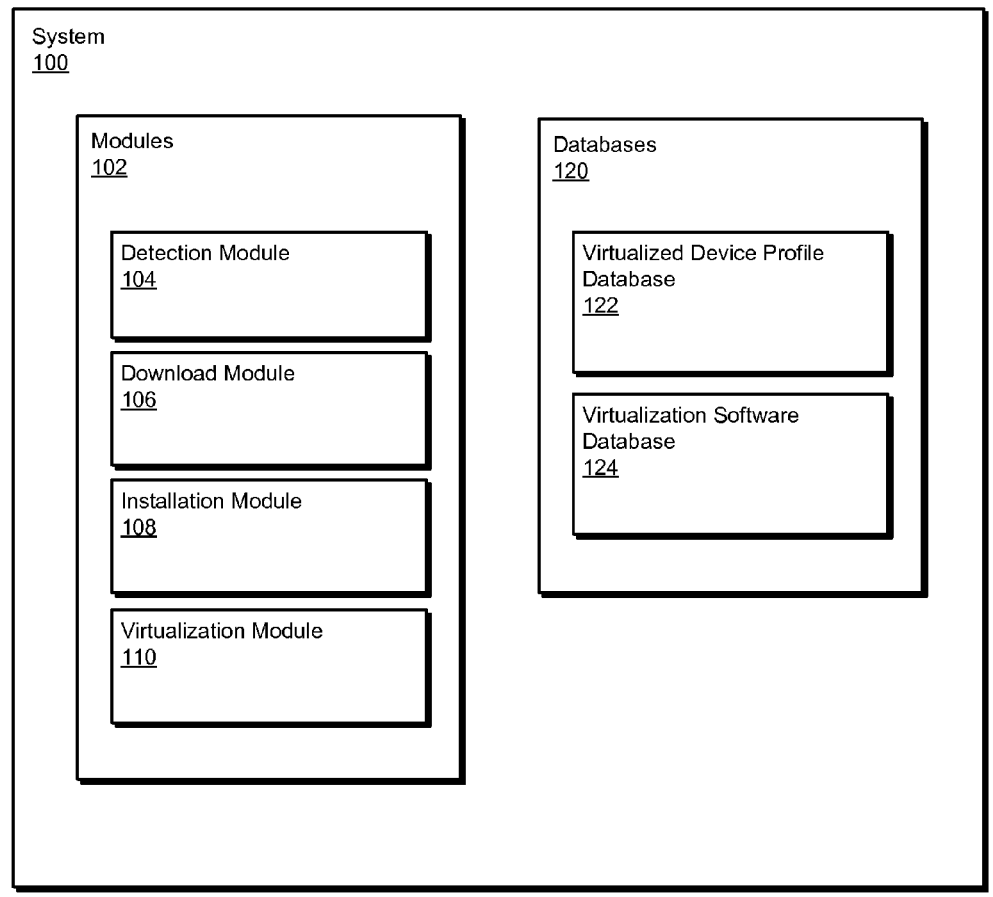
FIG. 1 is a block diagram of an exemplary system for virtualizing software associated with external computer hardware devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for virtualizing software associated with external computer hardware devices. Systems and methods described herein may use virtualized device profiles to enable users to efficiently and effectively move external hardware devices from one computing device to another computing device. Virtualized device profiles may include one or more device drivers, applications, and or settings used to interface with an external hardware device.

A virtualized device profile may be stored at a location where the virtualized device profile is accessible to multiple computers accessed by a user or group of users. Thus, when a user connects an external hardware device to one of the computers, the computer may download the virtualized device profile. The virtualized device profile may then be installed on the computer as a virtualization layer, and the virtualization layer may be activated to enable the virtualized device profile to be used to interact with the external hardware device.

Embodiments of the instant disclosure may provide various features and advantages over traditional hardware device installation systems. For example, installation of a virtualized device profile may be performed quickly and/or with little or no user interaction. Furthermore, since the virtualized device profile is installed as a virtualization layer (or multiple virtualization layers), the virtualized device profile may be efficiently removed and/or deactivated when the virtualized device profile is no longer needed.

Figure 2:
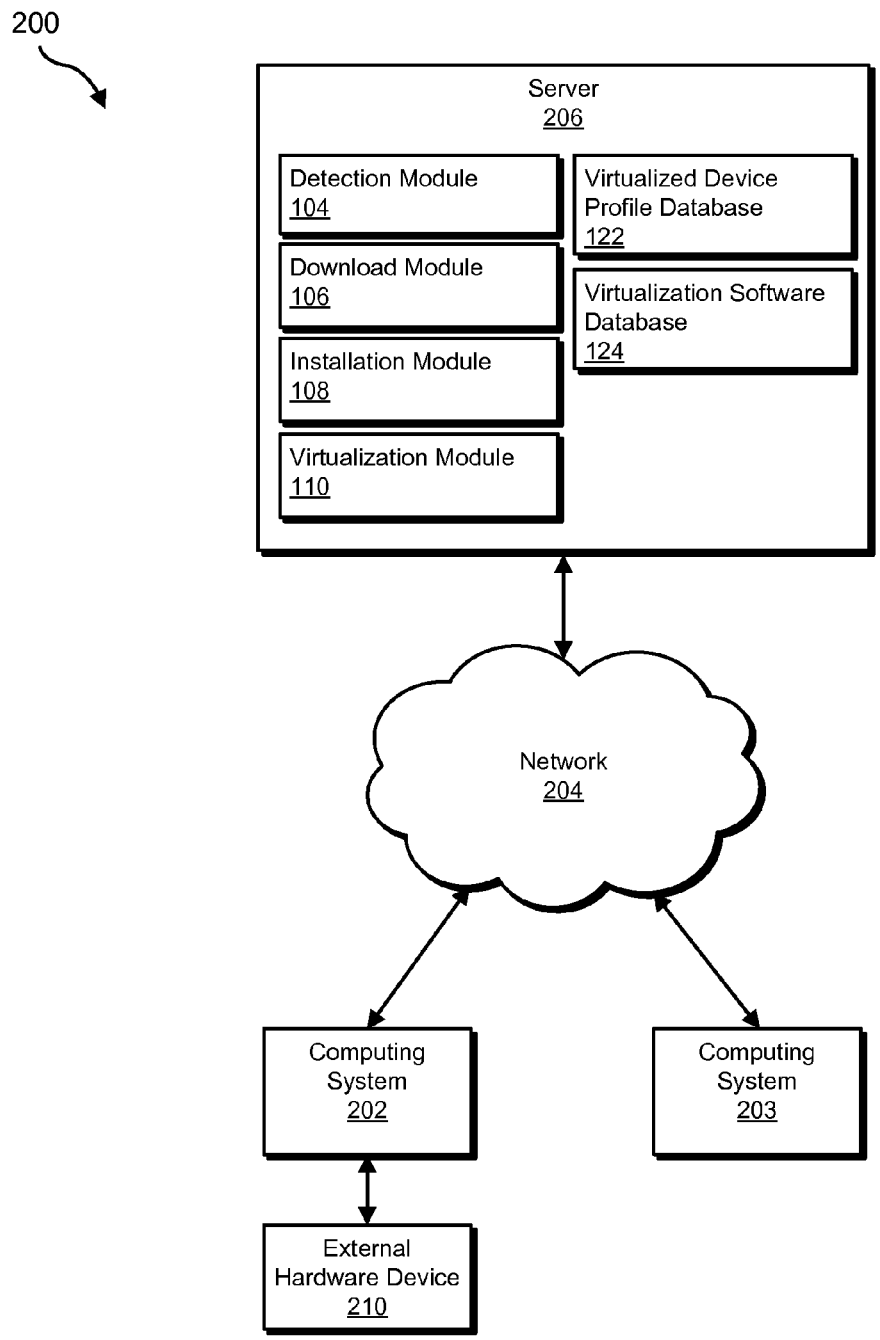
FIG. 2 is a block diagram of an exemplary system for virtualizing software associated with external computer hardware devices.

The following will provide, with reference to FIGS. 1-2, detailed descriptions of exemplary systems for virtualizing software associated with external computer hardware devices. Detailed descriptions of corresponding computer-implemented methods will also be provided in connection with FIG. 3. Detailed descriptions of exemplary virtualization systems are provided in FIGS. 4-7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for virtualizing software associated with external computer hardware devices. As illustrated in this figure, exemplary system 100 may include one or more modules 102 for performing one or more tasks. For example, and as will be explained in greater detail below, exemplary system 100 may include a detection module 104 programmed to receive a request to provide a virtualized device profile to a client system to which the external hardware device can be temporarily connected. Exemplary system 100 may also include a download module 106 programmed to download the virtualized device profile to the client system.

In addition, and as will be described in greater detail below, exemplary system 100 may include an installation module 108 programmed to install the virtualized device profile as one or more virtualization layers on the client system. System 100 may also include a virtualization module 110 programmed to activate the one or more virtualization layers to enable the virtualized device profile to be used to interact with the external hardware device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the system illustrated in FIG. 2, computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a virtualized device profile database 122 for storing one or more virtualized device profiles. Virtualized device profile database 122 may associate one or more virtualized device profiles with one or more external hardware devices and/or one or more users. System 100 may also include a virtualization software database that may store one or more virtualization agents for one or more computer platforms.

Databases 120 in FIG. 1 may represent a portion of one or more computing devices. For example, databases 120 may represent a portion of server 206 in FIG. 2, computing system 810 in FIG. 8, and/or portions of exemplary network architecture 900 in FIG. 9. Alternatively, databases 120 in FIG. 1 may represent one or more physically separate devices capable of being accessed by a computing device, such as server 206 in FIG. 2 computing system 810 in FIG. 8 and/or portions of exemplary network architecture 900 in FIG. 9.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202, a computing system 203, a network 204, a server 206, and an external hardware device 210. In some embodiments, server 206 may be an enterprise server, and computing systems 202 and 203 may be computing devices managed by the enterprise. In other embodiments, computing systems 202 and 203 may be a user's personal computing systems, and server 206 may host a third party service for managing virtualized device profiles.

As shown, server 206 may include detection module 104, download module 106, installation module 108, virtualization module 110, software database 122, and virtualization software database 124. In other embodiments all or a portion of one or more of the modules and/or databases on server 206 may be located on one or both of computing systems 202 and 203.

Computing systems 202 and 203 generally represent any type or form of computing device capable of reading computer-executable instructions. Examples of computing systems 202 and/or 203 include, without limitation, laptops, desktops, servers, cellular phones, personal digital assistants ("PDAs"), multimedia players, embedded systems, combinations of one or more of the same, exemplary computing system 810 in FIG. 8, or any other suitable computing device.

Server 206 generally represents any type or form of computing device that is capable of managing virtualized device profiles. Examples of server 206 include, without limitation, application servers and database servers configured to perform various functions described herein. While FIG. 2 shows server 206 supporting two computing systems, in other embodiments server 206 may support any number of computing systems.

Server 206, computing system 202, and computing system 203 may communicate over network 204. Network 204 generally represents any medium or architecture capable of facilitating communication or data transfer. Examples of network 204 include, without limitation, an intranet, a Wide Area Network ("WAN"), a Local Area Network ("LAN"), a Personal Area Network ("PAN"), the Internet, Power Line Communications ("PLC"), a cellular network (e.g., a GSM Network), exemplary network architecture 900 in FIG. 9, or the like. Network 204 may facilitate communication or data transfer using wireless or wired connections.

As noted, system 200 may include external hardware device 210. As used herein, the phrase "external hardware device" generally refers to any hardware device configured to connect to a computing system via an external communication port of the computing system. External hardware devices include, but are not limited to, printers, Universal Serial Bus ("USB") drives, optical drives, external hard drives, cameras, monitors, mp3 players, mobile phones, wireless routers, scanners, and various other devices that may be connected to a computing system. External hardware devices may connect to a computing system via a USB port, a FIREWIRE port, a VGA port, a wireless network, a Bluetooth network, and/or any other external port or communication mechanism of a computing system.

As shown in FIG. 2, external hardware device 210 may be connected to computing system 202. When external hardware device 210 is connected to computing system 202, a virtualized device profile may be installed and activated on computing system 202. The virtualized device profile may enable interaction with external hardware device 210. A user may move from computing system 202 to computing system 203, and may disconnect external hardware device 210 from computing system 202 and connect external hardware device 210 to computing system 203. As discussed below, when external hardware device 210 is disconnected from computing system 202, the virtualized device profile may be deactivated and/or deleted. Conversely, when external hardware device 210 is connected to computing system 203, the virtualized device profile may be downloaded from server 206 and installed on computing system 203.

Figure 3:
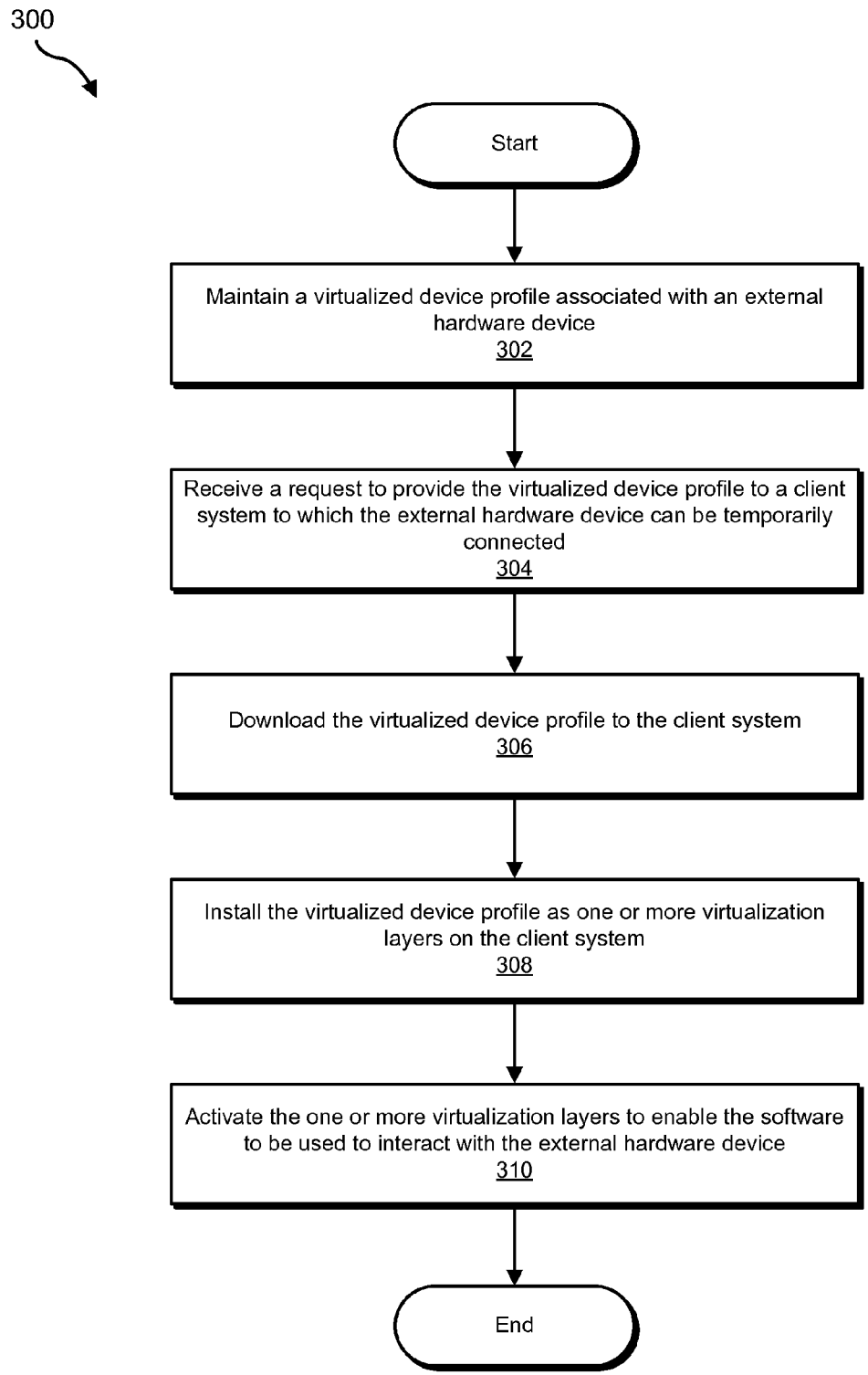
FIG. 3 is a flow diagram of an exemplary method for virtualizing software associated with external computer hardware devices.

FIG. 3 is a flow diagram of an exemplary computer-implemented method 300 for virtualizing software associated with external computer hardware devices. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. For example, at step 302 a virtualized software management system, such as system 200, may maintain a virtualized device profile associated with an external hardware device. The virtualized device profile may be maintained in a variety of ways. For example, the virtualized device profile may be stored on a computing device remote from computing devices that connect to the external hardware device. As an example, the virtualized device profile may be stored on a server, such as server 206, to which multiple computing devices have access. In some embodiments, the virtualized device profile may be maintained in a cloud computing environment. Alternatively, the virtualized device profile may be maintained on one client system, such as computing system 203 and may be accessible by another system, such as computing system 202.

The virtualized device profile may contain one or more drivers, applications, and/or settings associated with the external hardware device. One or more of the drivers, applications, and/or settings in the virtualized device profile may be stored as a virtualization layer that may be installed and activated on a client system. For example, the virtualized device profile may include a virtualization layer that includes an application and application settings associated with the external hardware device. The same virtualization layer may also include a driver for the external hardware device. Alternatively, the virtualized device profile may include a first virtualization layer that includes an application associated with the external hardware device and a second virtualization layer that include a driver for the external hardware device.

Applications, settings, and/or drivers provided in a virtualization layer may be referred to as virtualized software components. Applications, settings, and/or drivers may be virtualized by being installed to a directory structure referred to as a virtualization layer. As discussed in FIGS. 4-7, a virtualization layer may be a layer to which a file system filter driver redirects calls when the virtualization layer is installed on a client system.

In some embodiments, one or more components of the virtualized device profile may not be virtualized (i.e., provided in a virtualization layer). For example, an application and settings associated with an external hardware device may be virtualized, while a driver associated with the external hardware device may not be virtualized. In other embodiments, only the application associated with the external hardware device may be virtualized, and any drivers or settings provided with the application may not be virtualized.

At step 304, detection module 104 may receive a request to provide the virtualized device profile to a client system to which the external hardware device can be temporarily connected. Detection module 104 may receive the request in a variety of contexts. For example, detection module 104 may receive the request when a user logs onto a computing device, when the external hardware device is connected to the computing device, in response to a user request, and/or in any other suitable manner.

As noted, detection module 104 may receive the request to provide the virtualized device profile to a client system in response to a user logging on to the client system. For example, a user may log onto computing system 202. After the user logs onto computing system 202, detection module 104 may identify the user (e.g., using log-in information or any other suitable identification information associated with the user). Detection module 104 may use the identification information to determine that the user is associated with the software. Detection module 104 may select the virtualized device profile from a set of virtualized device profiles. For example, a database, such as virtualized device profile database 122, may store numerous virtualized device profiles for one or more users and/or groups of users. Thus, detection module 104 may use the identification information of the user, which may be identification of the user or a user group the user is associated with, to identify a virtualized device profile associated with the user.

In addition to and/or instead of being triggered by user login, the request to provide the virtualized device profile to the client system may be triggered by detecting that the external hardware device has connected to the client system. For example, a user may log into computing system 203 and may then connect external hardware device 210 to computing system 203. Detection module 104 may detect connection of external hardware device 210 to computing system 203. For example, detection module 104 may hook an Application Programming Interface ("API") of computing system 203 that detects new hardware being added to computing system 203.

In some embodiments, detection module 104 may also determine whether a driver (or other software component) associated with the external hardware device is already installed. For example, detection module 104 may search for hardware drivers on computing system 203 to determine whether computing system 203 already includes a driver that supports the external hardware device. If computing system 203 already includes the driver needed for the external hardware device, detection module 104 may indicate that the driver does not need to be downloaded and/or installed to computing system 203. If the driver has not been installed, the driver may be downloaded to computing system 203 and installed in a virtualization layer, through a command line script, using plug-in-play functionality supported by an operating system of the client system, and/or in any other suitable manner.

At step 306, download module 106 may download the virtualized device profile to the client system, and at step 308, installation module 108 may install the virtualized device profile to the client system in one or more virtualization layers. Installation module 108 may install the virtualized device profile in a variety of manners. For example, installation module 108 may install the virtualized device profile by copying the virtualized device profile to a location to which calls to the virtualized device profile may be directed. Additionally or alternatively, installation module 108 may install the virtualized device profile by providing a virtualization agent, such as virtualization module 110, with information about the location to which the virtualized device profile was downloaded. In some embodiments, installation module 108 may install the virtualized device profile by simply informing a virtualization agent that the virtualized device profile has been downloaded.

In some embodiments, detection module 104 may determine whether a virtualization agent, such as virtualization module 110, is installed on the client system. If a virtualization agent is not already installed on the client system, detection module 104 may initiate download and installation of a virtualization agent. For example, a virtualization agent compatible with the platform of the client system may be located in virtualization software database 124 and downloaded to the client system. The virtualization agent may then be installed on the client system.

Once a virtualization agent is installed on the client system, at step 310 the virtualization agent (e.g., virtualization module 110) may activate the one or more virtualization layers to enable the software to be used to interact with the external hardware device. The virtualization agent may activate virtualization layers by making the virtualization layers visible to an operating system of the client system. Activation and deactivation of virtualization layers is described in greater detail below in FIGS. 4-7.

When the virtualized device profile is no longer needed on the client system, the virtualization layer (or layers) that includes the virtualized device profile may be deactivated and/or deleted. Furthermore, if a non-virtualized driver was installed to support the external hardware device, the non-virtualized driver may be uninstalled and deleted. Similarly, if a virtualization agent was downloaded and installed to support management of the virtualization layers, the virtualization agent may be uninstalled and/or deleted.

The following description provides an example of how the method disclosed in FIG. 3 and the system of FIG. 2 may be implemented in an enterprise environment. In this example, computing systems 202 and 203 may be workstations that are accessed by a number of different users. Each user may be associated with a virtualized device profile stored in virtualized device profile database 122. The virtualized device profiles may be associated with an audio recording device and may each include settings specific to a particular user.

A user in the enterprise may log onto computing system 202 and may connect the audio recording device to computing system 202, which may cause detection module 104 to identify a virtualized device profile associated with the audio recording device and the user. Download module 106 may download the virtualized device profile to computing system 202. Then, installation and virtualization modules 108 and 110 may install and activate the virtualized device profile.

The virtualized device profile may include audio recording software that supports the audio recording device and a driver needed by the audio recording device. While using the recording software, the user may update one or more settings of the recording software. In some embodiments, the virtualized device profile may be updated with these settings (e.g., the new settings may be uploaded to the virtualized device profile stored in virtualized device profile database 122). When the user is done using the audio recording device, the user may disconnect the device, and the virtualized device profile may be deactivated and removed from computing system 202.

As another example, the method disclosed in FIG. 3 and the system of FIG. 2 may be implemented in a home environment. In this example, computing system 202 may be a laptop of a user and computing system 203 may be a desktop of the user. Virtualized device profile database 122 may store one or more virtualized device profiles for one or more external hardware devices of the user. For example, virtualized device profile database 122 may store a virtualized device profile for a digital camera.

When the user connects the camera to computing system 203, the virtualized device profile for the digital camera may be downloaded to computing system 203. The virtualized device profile for the digital camera may include a picture editing software application and a driver for the digital camera. Computing system 203 may already have a driver for the digital camera; thus, only the picture editing software application may be installed as a virtualization layer to computing system 203.

In this example, a virtualization agent may also need to be downloaded to computing system 203. After the virtualization agent is downloaded and installed on computing system 203, the virtualization agent may activate the virtualization layer that includes the picture editing software application, and the picture editing software application may be automatically launched. Downloading and installing the virtualization agent and the virtualized device profile may be performed automatically and silently (e.g., in a background process) in a manner that is transparent to the user. When the user is done with the digital camera, the virtualized device profile may be deactivated but may not be deleted. Thus, when the user connects the digital camera to computing device 203 in the future, the virtualized device profile may simply be activated to allow the user to access the picture editing software.

Figure 4:
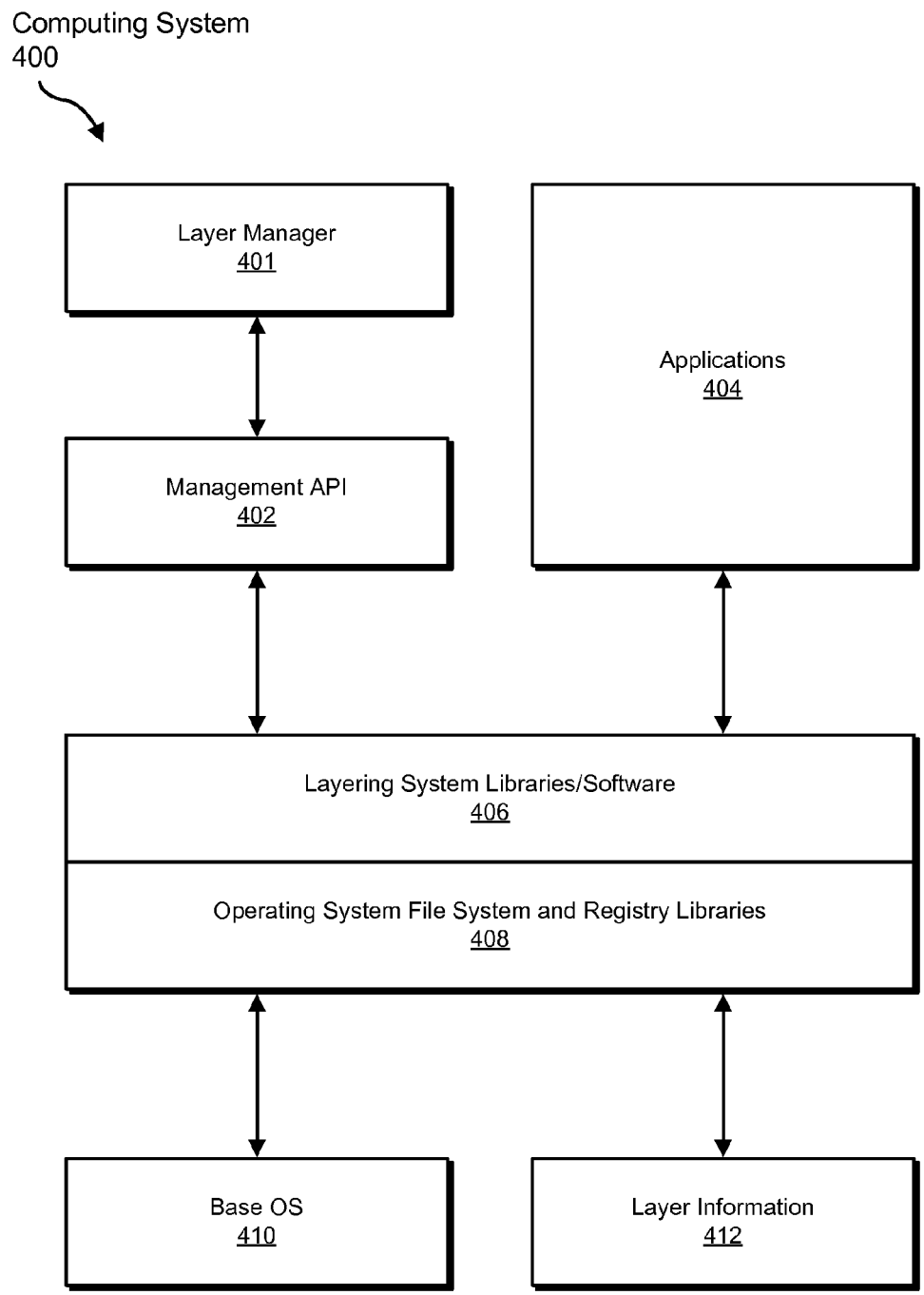
FIG. 4 is a block diagram of exemplary components of a conceptual level of a computing system configured to provide application virtualization according to certain embodiments.

FIGS. 4-7 provide examples of virtualization technologies and virtualized applications to which embodiments for virtualizing software associated with external hardware devices may be applied. FIG. 4 shows a conceptual organization of components of a computing system 400 with a virtualization layer. A base operating system 410 may form a platform with which applications may be executed and from which files may be accessed in file systems. Base operating system 410 may include registry settings, which may be globally available to applications for reading and writing. Computing system 400 may include libraries 408 for executing the functions of the operating system. Libraries 408 may include operating system files and registry entries. Layering system libraries and software 406 may be tied to libraries 408. Layering system libraries and software 406 may interpret file system and registry accesses from applications 404. The layering system software 406 may perform computations to determine whether the access should be permitted to continue to base operating system 410 or should be redirected to layer information 412. Layer information 412 may include information relating to the contents of files and registry settings. Layer manager 401 may control configuration of layering system software 406 through a management Application Programming Interface (API) 402.

In some application-virtualization technologies, each virtualization layer may include two sublayers: a read-only sublayer and a writable sublayer. An example of a virtualization technology that utilizes read-only and read-write sublayers is SYMANTEC WORKSPACE VIRTUALIZATION ("SWV").

A read-only sublayer may include an immutable base state of an application and/or hardware driver. In some embodiments, users may not—even unintentionally—make changes to the read-only sublayer. For example, in SWV, only administrators may be able to edit, update, and/or delete the contents of read-only sublayers. An application and/or hardware driver may be reset by deleting the existing read-only sublayer and replacing it with a new read-only sublayer.

A read-write (i.e., writeable) sublayer may capture changes to a base state of an application and/or driver. For example, when a user alters an application by changing default preferences, these changes may be written to the read-write sublayer.

Virtualized applications and/or drivers that include read-only sublayers and read-write sublayers may be created in any suitable manner. For example, a virtualization agent may allow a user to specify a setup program for an application the user wants to capture for purposes of virtualizing the application. The virtualization agent may launch the setup program and capture all of the applications, files, and processes, including child processes and process-induced changes, in a single Virtual Software Package ("VSP"). The virtualization agent may also capture MICROSOFT installer ("MSI") and service control manager changes. When the setup process is complete, the virtualization agent may automatically stop the capture process. An administrator may then edit the VSP to include settings that the administrator wants to distribute to users.

Figure 5:
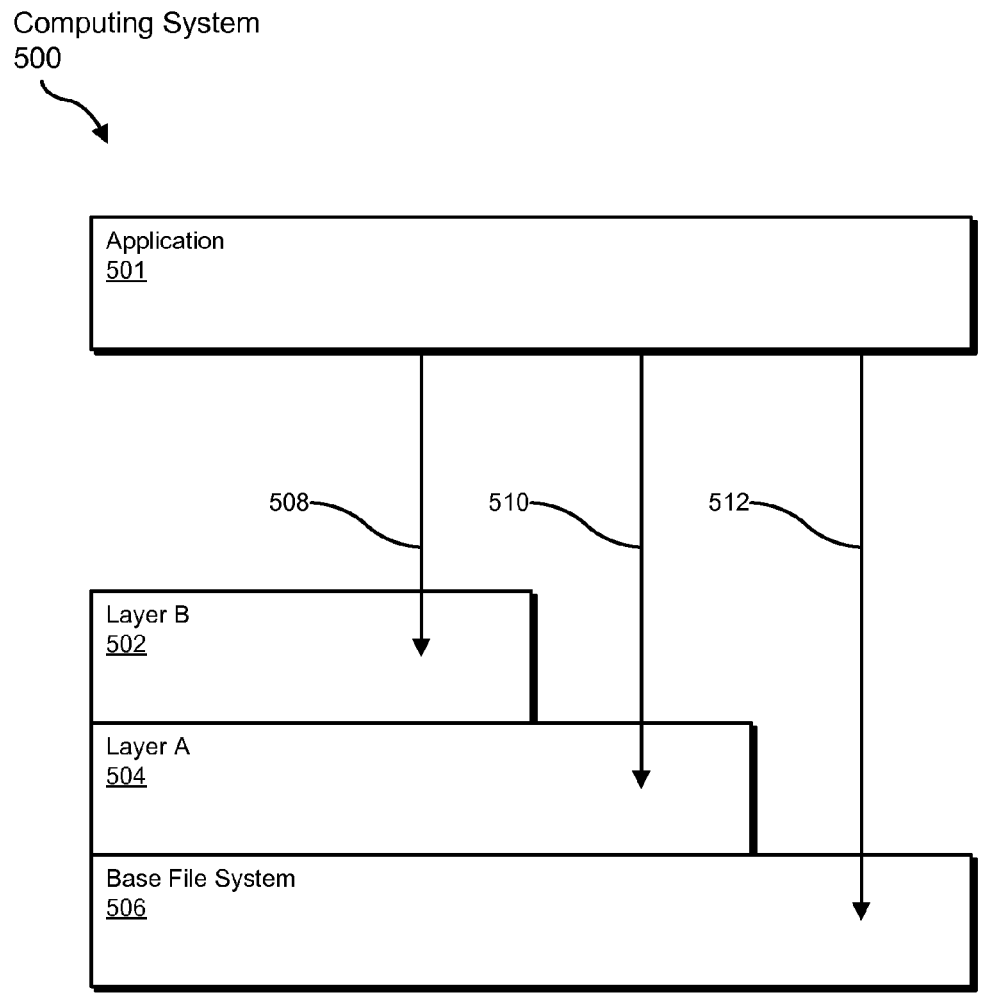
FIG. 5 is a block diagram showing virtualization layer prioritization according to certain embodiments.

FIG. 5 shows the operation of a computing system 500 with multiple virtualization layers. FIG. 5 illustrates an application 501, which may be a first and/or second version of an application. One or more files associated with application 501 may be located on virtualization layer B 502 and/or virtualization layer A 504. Virtualization layer B 502 may have priority over virtualization layer A 504, which in turn may have priority over a base file system 506. Application 501 may operate as follows. A first file access 508 may be made by application 501. A virtualization system may first search in layer B 502 for the requested file. Layer B 502 may include an entry for file access 508, and the corresponding file in layer B 502 may be returned to the application. Since layer B 502 has priority over layer A 504 and base file system 506, even if layer A 504 and base file system 506 have entries that correspond to file access 508, the virtualization system will return the entry from layer B 502.

Application 501 may make another file access 510. The virtualization system may not find a corresponding entry in layer B 502, but may find an entry in layer A 504. A third file access request 512 may not have a corresponding entry in layer B 502 or layer A 504, and the virtualization system may therefore return an entry from base file system 506.

Figure 6:
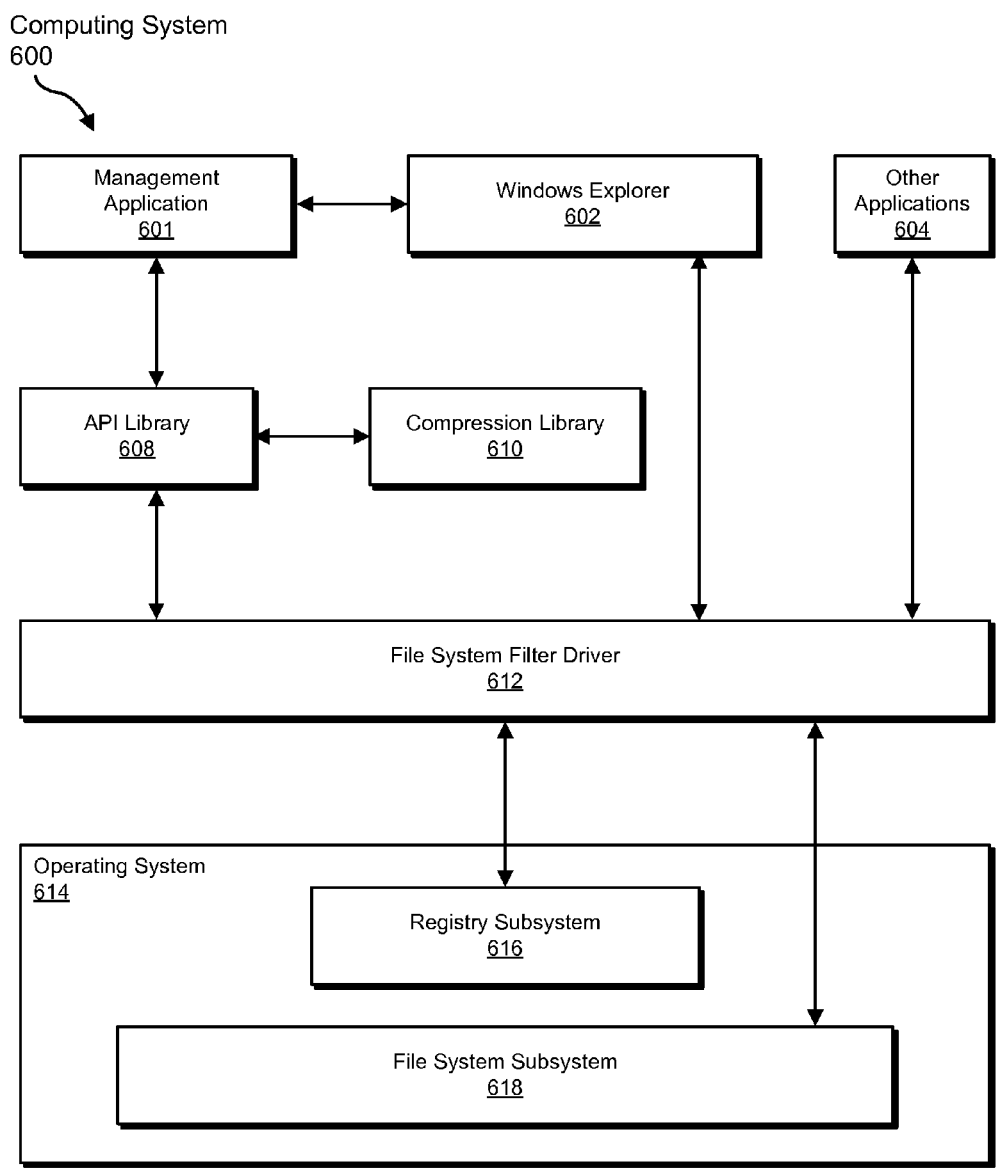
FIG. 6 is a block diagram of a component of a computing system that includes virtualization layers according to certain embodiments.

FIG. 6 shows an example of a computing system 600 with a virtualization layer installed. The computing system may include an operating system 614. Operating system 614 may include a registry subsystem 616 and a file system subsystem 618. A file system filter driver 612 may be installed on operating system 614 and may have first processing priority for registry and file system accesses. A management application 601 may provide an administrator with an interface to interact with file system filter driver 612 and make changes to layers. An API library 608 may provide a convenient interface for management application 601 to interface with file system filter driver 612.

Management application 601 may provide notices to a WINDOWS EXPLORER 602 indicating that the contents of a mounted file system have been changed. Other applications 604 may interact with the system, performing read and write operations to the file system and registry through file system filter driver 612. A compression library 610 may be provided to compress layer information.

File system filter driver 612 may store components of each layer and sublayer in one of two redirect areas (i.e. areas to which it redirects system calls). For example, file system filter driver 612 may store registry settings and attributes in a registry subsystem 616 and may store files in a file system subsystem 618.

In each sublayer's registry redirection area, file system filter driver 612 may store information about the state of the layer to which the sublayer belongs. File system filter driver 612 may also store references to the sublayer's file redirection area, reference counts, and sub-keys that—through a service control manager—may enable it to handle duplicate services running in multiple layers. In addition, file system filter driver 612 may store references to registry keys that contain user identity information, data-layer specifications, a sub-key for information about exclude entries, and a list of variables that govern the location of layer-specific files. As the name suggests, exclude entries may define application files and processes that a user may want to exclude from layers.

In the root of the file redirection area, file system filter driver 612 may store variable entries that abstract operating system specific file locations to enable users to deploy Virtual Software Archives ("VSAs") on computers running various types of operating systems. When file system filter driver 612 is loaded on a user's computer, file system filter driver 612 may determine values for user and system variables.

File system filter driver 612 may store files that comprise sublayers and numbered folders under a file-redirection-area directory. File system filter driver 612 may use registry and file redirection areas to present to an operating system—and by extension, applications and users—with an aggregate view of virtualized files and data.

For example, a user may launch WINDOWS EXPLORER to view the contents of a program file folder. The user's machine may be running a virtualized application, such as MOZILLA FIREFOX, and the FIREFOX layer may be active. File system filter driver 612 may intercept EXPLORER's calls to the file system. From the base, which may include all files, settings, and processes that do not reside in layers on the user's machine, file system filter driver 612 may gather a list of non-virtualized applications that reside in the program files folder. File system filter driver 612 may also redirect Explorer's calls to include FIREFOX, which would normally reside in the program files folder but which, in this case, resides in the file redirection area. File system filter driver 612 may then respond to EXPLORER's calls with a complete list of folders that the system expects to see in the program files directory, including FIREFOX. In this example, if the FIREFOX layer were deactivated, file system filter driver 612 would obscure its existence.

Figure 7:
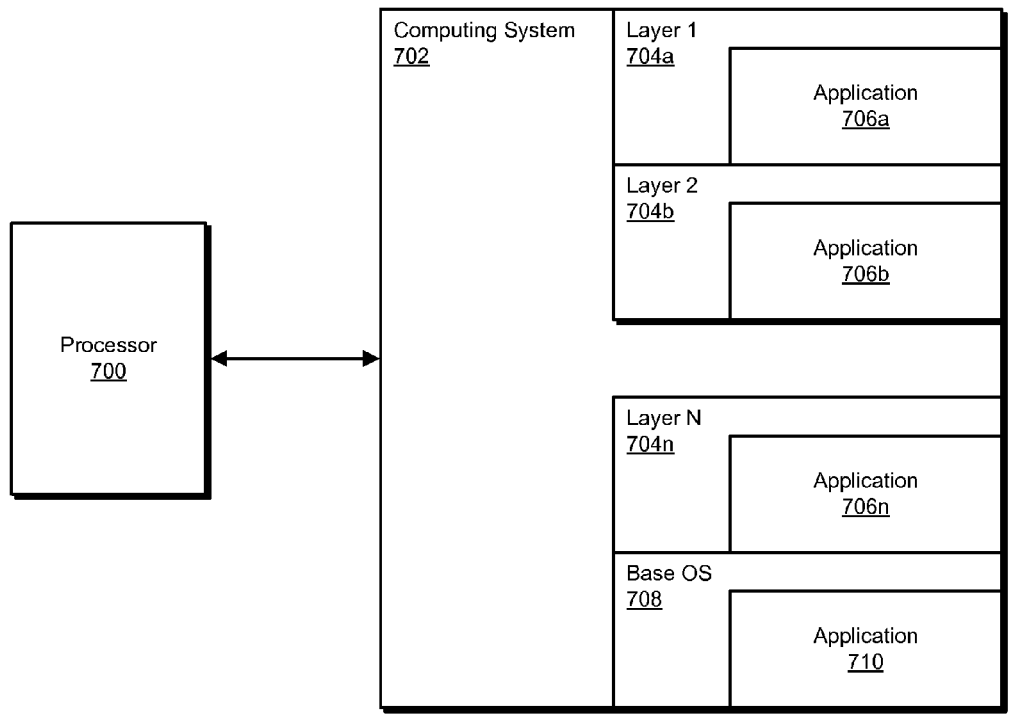
FIG. 7 is a block diagram showing organization of virtualization layers on a computing system according to certain embodiments.

FIG. 7 illustrates an example of a computing system 702 that includes virtualized applications 706a-n. Computing system 702 may contain a number of layers 704a-n. Applications 706a-n may be installed on layers 704a-n, respectively. As referred to herein, a layer (or virtualization layer) may refer to a set of file system and registry changes that may be managed by application virtualization software. In some embodiments, a layer may contain changes to one or more file systems but may not contain registry changes.

A layer may isolate an application from a base file system and may include files and a directory structure of the application's installation. The application files and directories may be shadowed or overlaid over the regular file system. Shared libraries (such as DLLs), system accessible configuration (such as registry entries), and version control may be managed by a layering subsystem.

Though each layer may be a separate and individual entity within a computing system, the application files, data, and system-accessible configuration may be presented as though they resided in their respective ordinary locations. Thus, an application stored in a layer may appear to the operating system of a computing system as if it had been installed using traditional installation techniques.

A software application installed in a virtualization layer may be an application in any commonly used meaning, including word processors, browsers, system tools, games, and the like, and the principles described herein may also extend to any other software installed on a computing system. Similarly, a hardware driver installed in a virtualization layer may be an suitable hardware driver for any suitable external hardware device.

Figure 8:
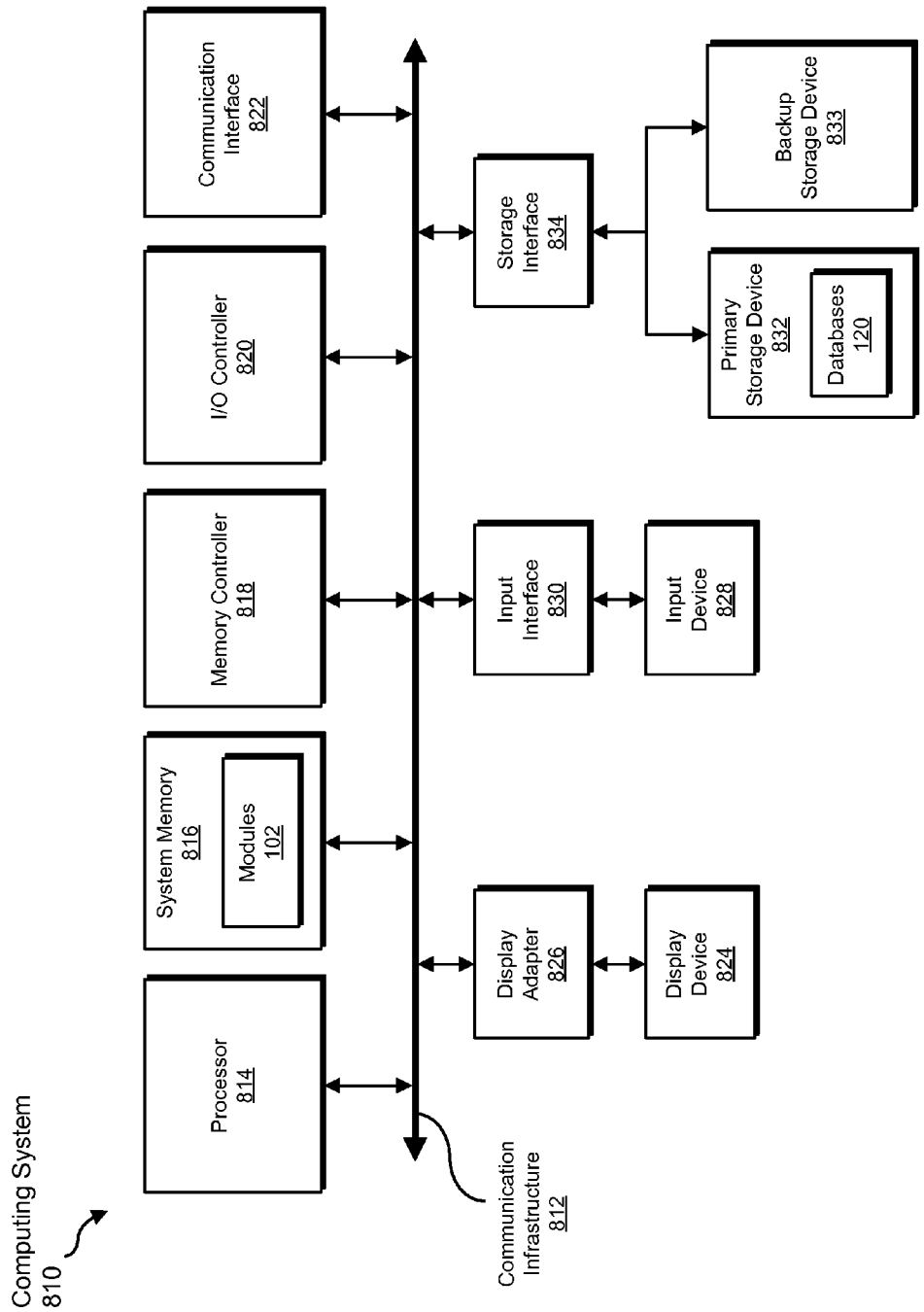
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the maintaining, receiving, downloading, installing, activating, identifying, selecting, determining, deactivating, and detecting steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions.

Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller may perform and/or be a means for performing, either alone or in combination with other elements, one or more of the steps or features described and/or illustrated herein, such as maintaining, receiving, downloading, installing, activating, identifying, selecting, determining, deactivating, and detecting.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the maintaining, receiving, downloading, installing, activating, identifying, selecting, determining, deactivating, and detecting steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the maintaining, receiving, downloading, installing, activating, identifying, selecting, determining, deactivating, and detecting steps disclosed herein. Communication interface 822 may also be used to perform and/or be a means for performing other steps and features set forth in the instant disclosure.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the maintaining, receiving, downloading, installing, activating, identifying, selecting, determining, deactivating, and detecting steps disclosed herein. Input device 828 may also be used to perform and/or be a means for performing other steps and features set forth in the instant disclosure.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810. In one example, databases 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, storage devices 832 and 833 may be used, for example, to perform and/or be a means for performing, either alone or in combination with other elements, one or more of the maintaining, receiving, downloading, installing, activating, identifying, selecting, determining, deactivating, and detecting steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
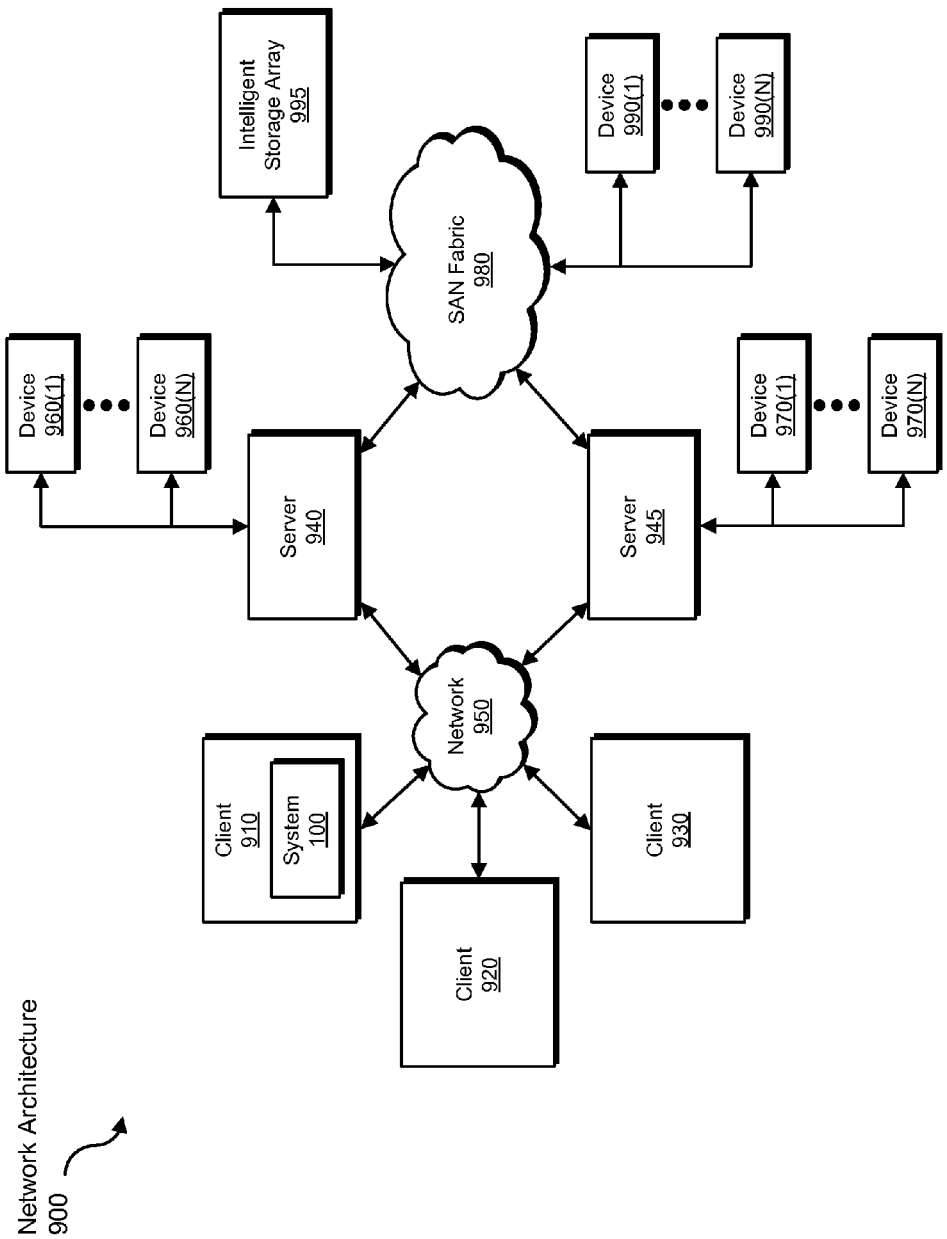
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. In one example, client system 910 may include system 100 from FIG. 1.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the maintaining, receiving, downloading, installing, activating, identifying, selecting, determining, deactivating, and detecting steps disclosed herein. Network architecture 900 may also be used to perform and/or be a means for performing other steps and features set forth in the instant disclosure.

As detailed above, computing system 810 and/or one or more components of network architecture 900 may perform and/or be a means for performing, either alone or in combination with other elements, one or more steps of an exemplary method for virtualizing software associated with external computer hardware devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned, from, and/or to a cloud computing environment and/or one or more of modules 102 may operate in a cloud computing environment.

In addition, one or more of the modules described herein may transform data, physical devices, and/or representations of physical devices from one form to another. For example, one or more of the modules described herein may transform a computing system into a computing system that supports an external hardware device by installing a virtualized profile database on the computing system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for virtualizing software associated with external computer hardware devices, at least a portion of the method being performed by a computing device comprising at least one processor, the method comprising:
   detecting that a user is logged onto a first client system and that an external hardware device is connected to an external communication port of the first client system;
   while the user is detected as being logged onto the first client system and the external hardware device is connected to the first client system, obtaining from the first client system a virtualized device profile associated with the external hardware device and the user, wherein the virtualized device profile comprises user-customized settings associated with the external hardware device and the user;
   detecting that the user is logged onto a second client system;
   detecting user connection of the external hardware device to an external communication port of the second client system;
   in response to detecting the connection of the external hardware device to the second client system:
      downloading the virtualized device profile associated with the external hardware device and the user to the second client system;
      installing the virtualized device profile as one or more virtualization layers on the second client system;
      activating the one or more virtualization layers to enable the virtualized device profile to be used to interact with the external hardware device.

2. The method of claim 1, wherein:
   the user is associated with a group of users;
   the virtualized device profile is associated with the group of users and comprises user-customized settings associated with the group of users.

3. The method of claim 1, wherein:
   the user-customized settings associated with the external hardware device and the user comprise driver settings and application settings.

4. The method of claim 1, wherein:
   the virtualized device profile comprises the one or more virtualization layers;
   the one or more virtualization layers comprise at least one of:
      a driver associated with the external hardware device;
      an application associated with the external hardware device;
      the user-customized settings associated with the external hardware device and the user.

5. The method of claim 1, further comprising:
determining that a virtualization agent is not installed on the client system;
downloading the virtualization agent to the client system, wherein:
the virtualization agent is programmed to manage application virtualization layers;
activating the one or more virtualization layers is performed by the virtualization agent.

6. The method of claim 5, further comprising:
uninstalling the virtualization agent from the client system when the external hardware device is disconnected from the client system.

7. The method of claim 1, further comprising:
determining that a driver for the external hardware device is not installed on the client system, wherein:
downloading the virtualized device profile to the client system comprises downloading the driver to the client system;
installing the virtualized device profile to the client system comprises installing the driver to the client system in the one or more virtualization layers.

8. The method of claim 1, further comprising:
deactivating the one or more virtualization layers when at least one of the following occurs:
the external hardware device is disconnected from the client system;
the user logs off the client system.

9. The method of claim 8, further comprising:
after deactivating the one or more virtualization layers, deleting the one or more virtualization layers.

10. The method of claim 1, further comprising:
detecting that the user updated the user-customized settings associated with the external hardware device and the user;
updating the virtualized device profile to include the updated user-customized settings.

11. A system for virtualizing software associated with external computer hardware devices, the system comprising:
while a user is detected as being logged onto a first client system and a external hardware device is connected to the first client system, a storage device configured to obtain from the first client system a virtualized device profile associated with the external hardware device and the user, wherein the virtualized device profile comprises user-customized settings associated with the external hardware device and the user;
a detection module programmed to:
detect that the user is logged onto the first client system;
detect that the user is logged onto a second client system;
detect user connection of the external hardware device to an external communication port of the first client system;
detect user connection of the external hardware device to an external communication port of the second client system;
a download module programmed to download the virtualized device profile associated with the external hardware device and the user to the second client system;
an installation module programmed to install the virtualized device profile as one or more virtualization layers on the second client system;
a virtualization module programmed to activate the one or more virtualization layers to enable the virtualized device profile to be used to interact with the external hardware device;
at least one processor programmed to execute the detection module, the download module, the installation module, and the virtualization module.

12. The system of claim 11, wherein:
the user is associated with a group of users;
the virtualized device profile is associated with the group of users and comprises user-customized settings associated with the group of users.

13. The system of claim 11, wherein:
the user-customized settings associated with the external hardware device and the user comprise driver settings and application settings.

14. The system of claim 11, wherein:
the virtualized device profile comprises the one or more virtualization layers;
the one or more virtualization layers comprise at least one of:
a driver associated with the external hardware device;
an application associated with the external hardware device;
the user-customized settings associated with the external hardware device and the user.

15. The system of claim 11, wherein the detection module is further programmed to:
determine that a driver for the external hardware device is not installed on the client system, wherein the virtualized device profile comprises the driver for the external hardware device.

16. The system of claim 11, wherein the virtualization module is programmed to:
deactivate the one or more virtualization layers when at least one of the following occurs:
the external hardware device is disconnected from the client system;
the user logs off the client system.

17. The system of claim 16, wherein the virtualization module is programmed to:
delete the one or more virtualization layers after the one or more virtualization layers are deactivated.

18. The system of claim 11, wherein the detection module is programmed to:
detect that the user updated the user-customized settings associated with the external hardware device and the user;
update the virtualized device profile to include the updated user-customized settings.

19. A non-transitory computer-readable-storage medium comprising one or more computer-executable instructions that, when executed by a computing device, cause the computing device to:
detect that a user is logged onto a first client system and that an external hardware device is connected to an external communication port of the first client system;
while the user is detected as being logged onto the first client system and the external hardware device is connected to the first client system, obtain from the first client system a virtualized device profile associated with the external hardware device and the user, wherein the virtualized device profile comprises user-customized settings associated with the external hardware device and the user;
detect that the user is logged onto a second client system;
detect user connection of the external hardware device to an external communication port of the second client system;
in response to detecting the connection of the external hardware device to the second client system:

download the virtualized device profile associated with the external hardware device and the user to the second client system;

install the virtualized device profile as one or more virtualization layers on the second client system;

activate the one or more virtualization layers to enable the virtualized device profile to be used to interact with the external hardware device.

20. The non-transitory computer-readable storage medium of claim 19, wherein:

the user is associated with a group of users;

the virtualized device profile is associated with the group of users and comprises user-customized settings associated with the group of users.

* * * * *

UNITED STATES PATENT AND TRADEMARK OFFICE
CERTIFICATE OF CORRECTION

| | | |
|---|---|---|
| PATENT NO. | : 8,881,140 B1 | Page 1 of 1 |
| APPLICATION NO. | : 12/554413 | |
| DATED | : November 4, 2014 | |
| INVENTOR(S) | : Cynthia Bringhurst | |

It is certified that error appears in the above-identified patent and that said Letters Patent is hereby corrected as shown below:

In the Claims

Claim 11, at column 19, line 41, should read:

system and an external hardware device is connected to

Signed and Sealed this
Twenty-eighth Day of April, 2015

Michelle K. Lee
*Director of the United States Patent and Trademark Office*